US008947673B2

(12) United States Patent
Pahk et al.

(10) Patent No.: US 8,947,673 B2
(45) Date of Patent: Feb. 3, 2015

(54) ESTIMATING THICKNESS BASED ON NUMBER OF PEAKS BETWEEN TWO PEAKS IN SCANNING WHITE LIGHT INTERFEROMETRY (75) Inventors: Heui Jae Pahk, Seoul (KR); Woo Jung Ahn, Gyeonggi-do (KR); Seong Ryong Kim, Seoul (KR); Jun Hyeok Lee, Seoul (KR)

(73) Assignee: Snu Precision Co., Ltd., Seoul (KR)

( * ) Notice: Subject to any disclaimer, the term of this patent is extended or adjusted under 35 U.S.C. 154(b) by 900 days.

(21) Appl. No.: 12/993,301

(22) PCT Filed: Jan. 16, 2009

(86) PCT No.: PCT/KR2009/000250
§ 371 (c)(1),
(2), (4) Date: Mar. 4, 2011

(87) PCT Pub. No.: WO2010/002085
PCT Pub. Date: Jan. 7, 2010

(65) Prior Publication Data
US 2011/0188048 A1    Aug. 4, 2011

(30) Foreign Application Priority Data
Jun. 30, 2008    (KR) .......................... 10-2008-0062382

(51) Int. Cl.
G01B 11/02    (2006.01)
G01B 11/06    (2006.01)

(52) U.S. Cl.
CPC ................................. *G01B 11/0675* (2013.01)
USPC ....................................................... 356/504

(58) Field of Classification Search
CPC ............. G01B 9/02088; G01B 9/0209; G01B 9/02091; G01B 11/0675; G01B 11/2441

USPC ................................................... 356/504, 497
See application file for complete search history.

(56) References Cited

U.S. PATENT DOCUMENTS 5,555,472 A * 9/1996 Clapis et al. ................. 356/504
7,522,289 B2 4/2009 Cantin et al.

FOREIGN PATENT DOCUMENTS

JP    1 057108 A    3/1989
JP    2003240515 A    8/2003

(Continued)

OTHER PUBLICATIONS

Search Report for PCT/KR2009/000250, dated Jun. 29, 2009, 2 pages.

(Continued)

*Primary Examiner* — Hwa Lee
(74) *Attorney, Agent, or Firm* — Dority & Manning, P.A.

(57) ABSTRACT

Disclosed is a method of measuring thickness or a surface profile of a thin film layer formed on a base layer through a white light scanning interferometry, the method including: preparing simulation interference signals corresponding to thicknesses by assuming a plurality of sample thin film layers different in thickness from one another and simulating interference signals with respect to the respective sample thin film layers; acquiring a real interference signal with respect to an optical-axis direction of entering the thin film layer by illuminating the thin film layer with white light; preparing a plurality of estimated thicknesses that the thin film layer may have on the basis of the real interference signal; comparing whether the simulation interference signal having thickness corresponding to the estimated thickness is substantially matched with the real interference signal; and determining the thickness of the simulation interference signal substantially matched with the real interference signal as the thickness of the thin film layer.

7 Claims, 8 Drawing Sheets

(56) References Cited

FOREIGN PATENT DOCUMENTS

| | | |
|---|---|---|
| JP | 2004144544 A | 5/2004 |
| JP | 2004340680 A | 12/2004 |
| JP | 2006170847 A | 6/2006 |
| KR | 20020009512 | 2/2002 |
| KR | A 20010654177 | 12/2006 |

OTHER PUBLICATIONS

Abstract of Taiwanese Patent No. TW200806951(A), Feb. 1, 2008, 1 page.
Abstract of Taiwanese Patent No. TW200741199(A), Nov. 1, 2007, 1 page.

* cited by examiner

ESTIMATING THICKNESS BASED ON NUMBER OF PEAKS BETWEEN TWO PEAKS IN SCANNING WHITE LIGHT INTERFEROMETRY

CROSS-REFERENCE TO RELATED APPLICATION

This application claims priority to and the benefit of Korean Patent Application No. 10-2008-0062382 filed in the Korean Intellectual Property Office on Jun. 30, 2008, the entire contents of which are incorporated herein by reference.

BACKGROUND OF THE INVENTION (a) Field of the Invention

The present invention relates to a method for measuring thickness or a surface profile, and more particularly to a method for measuring thickness or a surface profile, which employs a white light scanning interferometry to correctly measure the thickness of a permeable thin film layer and the surface profile of the thin film layer.

(b) Description of the Related Art

Since control of the thickness of a thin film layer is a great deal of weight among many factors determining quality in a semiconductor process and a flat panel display (FPD) process, it is necessary to directly monitor the thickness of the thin film layer during the process. The 'thin film layer' is a layer formed on a base layer, i.e., a substrate and having a very thin thickness, which generally has a thickness of several tens Å~several μm. To apply these thin film layers to a certain use, it is needed to know the thickness, composition, roughness, and other physical and optical properties of the thin film layer. In particular, it has recently been a general trend for forming multiple ultra thin films on the substrate to increase integration of a semiconductor device. To develop such a highly-integrated semiconductor device, a property of matter such as the thickness of the thin film layer has to be precisely controlled as a factor of largely affecting the properties.

There are many methods of measuring the thickness of the thin film layer, which are employed in the semiconductor process and other applicable processes. Among many methods, a mechanical method using a stylus, an optical method, or the like are most general. In the case of the optical method, a white light interferometer may be used to determine the thickness of the thin film layer.

Figure 1:
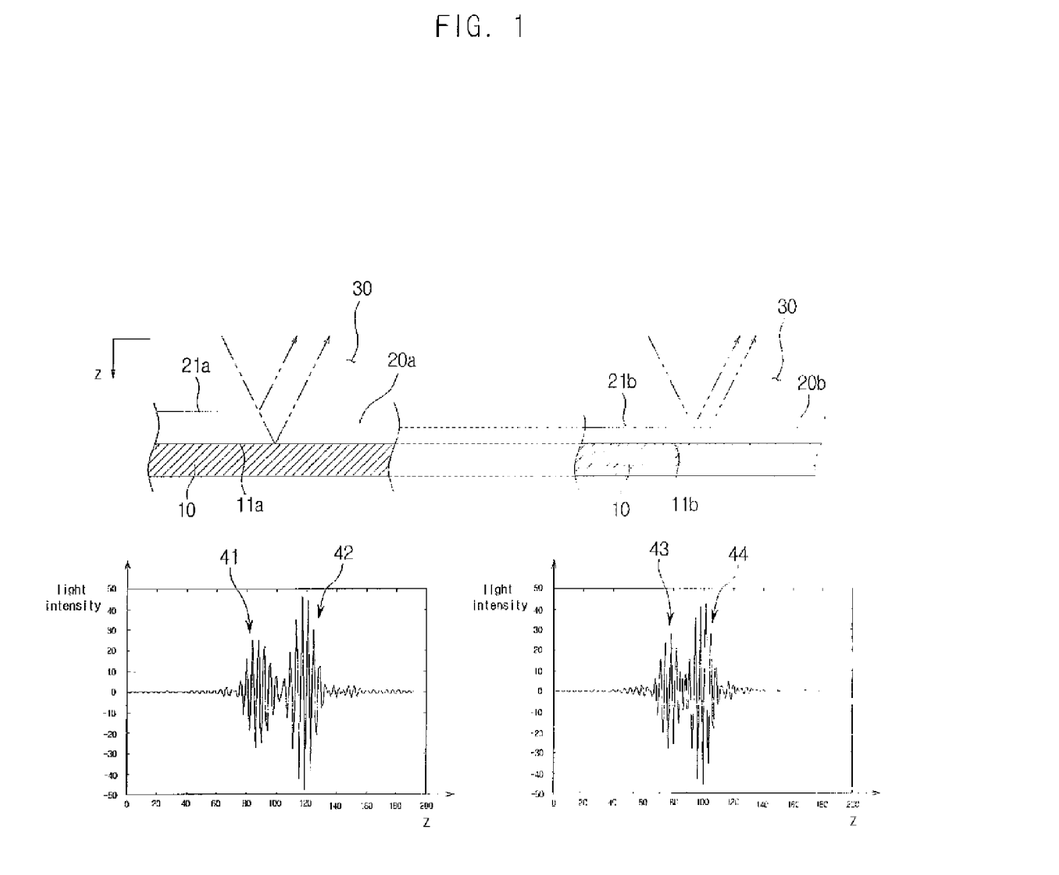
FIG. 1 shows an example of a conventional thickness measuring method.

FIG. 1 shows an example of a conventional method for measuring the thickness.

Referring to FIG. 1, permeable thin film layers 20a and 20b, the thickness of which will be measured, are formed on a base layer 10, and an air layer 30 is provided above the thin film layers 20a and 20b. First surfaces 21a and 21b indicate interfaces between the air layer 30 and the thin film layers 20a and 20b, and second surfaces 11a and 11b indicate interfaces between the thin film layers 20a and 20b and the base layer 10. The left thin film layer 20a is thicker than the right thin film layer 20b.

If the thin film layer 20a having a relatively thick thickness is illuminated with white light by the white light interferometer, a first waveform 41 is got from the first surface 21a and a second waveform 42 is got from the second surface 11a. The thin film layer 20a is so thick that the first waveform 41 and the second waveform 42 are not interfered but separated. Thus, it is possible to obtain the thickness of the thin film layer 20a by selecting the maximum peaks of the two waveforms 41 and 42.

However, in the case of the thin film layer 20b having a relatively thin thickness, it is impossible to obtain the thickness of the thin film layer 20b through the above method. That is, if the thin film layer 20b having a relatively thin thickness is illuminated with white light, there is interference between a first waveform 43 got from a first surface 21b and a second waveform 44 got from a second surface 11b. Thus, the interference makes it unclear whether a peak shown in the first and second waveforms is a peak based on real constructive interference or a peak based on interference between the first waveform 43 and the second waveform 44. Therefore, there is a problem that it is impossible to use a method of obtaining the thickness of the thin film layer 20b by selecting the maximum peaks of the two waveforms 43 and 44.

SUMMARY OF THE INVENTION

Accordingly, the present invention is conceived to solve the foregoing problems, and an aspect of the present invention is to provide a method for measuring thickness or a surface profile, which can correctly measure the thickness or the surface profile of a thin film layer that is so thin that interference can be generated between an interference signal waveform of an air layer—thin film layer interface and an interference signal waveform of a thin film layer—base layer interface, by preparing a simulation interference signal on the basis of simulation performed with regard to a plurality of sample thin film layers different in thickness from one another, obtaining a real interference signal with respect to the thin film layer formed on a base layer, and determining the thickness of the thin film layer on the basis of matching comparison between the real interference signal and the simulation interference signal.

An exemplary embodiment of the present invention provides a method of measuring thickness or a surface profile of a thin film layer formed on a base layer through a white light scanning interferometry, the method including: preparing simulation interference signals corresponding to thicknesses by assuming a plurality of sample thin film layers different in thickness from one another and simulating interference signals with respect to the respective sample thin film layers; acquiring a real interference signal with respect to an optical-axis direction of entering the thin film layer by illuminating the thin film layer with white light; preparing a plurality of estimated thicknesses that the thin film layer may have on the basis of the real interference signal; comparing whether the simulation interference signal having thickness corresponding to the estimated thickness is substantially matched with the real interference signal; and determining the thickness of the simulation interference signal substantially matched with the real interference signal as the thickness of the thin film layer.

The preparing the plurality of estimated thicknesses may include selecting two or more peaks from the real interference signal, and preparing the estimated thicknesses on the basis of the number of peaks between two peaks.

The preparing the plurality of estimated thickness may include dividing the real interference signal into a first waveform generated by interference on an interface between an air layer and the thin film layer, and a second waveform generated by interference on an interface between the thin film layer and the base layer; selecting peaks from the first waveform and the second waveform, respectively; and extracting the estimated thicknesses on the basis of the number of peaks between a peak of the first waveform and a peak of the second waveform.

The selecting the peaks may include setting up the maximum peak among the peaks of the second waveform as a reference peak; and selecting a plurality of peaks from the first waveform, and the extracting the estimated thicknesses may include combining the peaks of the first waveform with the reference peak, and calculating the number of peaks between the peak of the first waveform and the reference peak with regard to each combination case; and calculating the estimated thicknesses on the basis of the number of peaks.

The selecting the peak may include selecting a plurality of peaks from the first waveform, and a plurality of peaks from the second waveform, and the extracting the estimated thicknesses may include combining the peaks of the first waveform with the peaks of the second waveform, and calculating the number of peaks between the peak of the first waveform and the peak of the second waveform with regard to each combination case; and calculating the estimated thicknesses on the basis of the number of peaks.

The estimated thickness may be calculated by the following expression $$d_{con} = \frac{N \times \lambda}{2 \times n}$$

where, $d_{can}$ is the estimated thickness, N is the number of peaks, $\lambda$ is an equivalent wavelength of the white light, and n is a refractive index of the thin film layer.

The method may further include setting up a position about the optical-axis direction of entering the thin film layer as a surface height of the thin film layer, with respect to the peak of the first waveform corresponding to the determined thickness of the thin film layer; and obtaining a surface profile of the thin film layer by repeating the setup of the surface height while moving along the thin film layer.

DETAILED DESCRIPTION OF THE EMBODIMENTS

Hereinafter, exemplary embodiments of a wheel assembly and wheeled shoes having the same according to the present invention will be described in more detail with reference to accompanying drawings.

Figure 2:
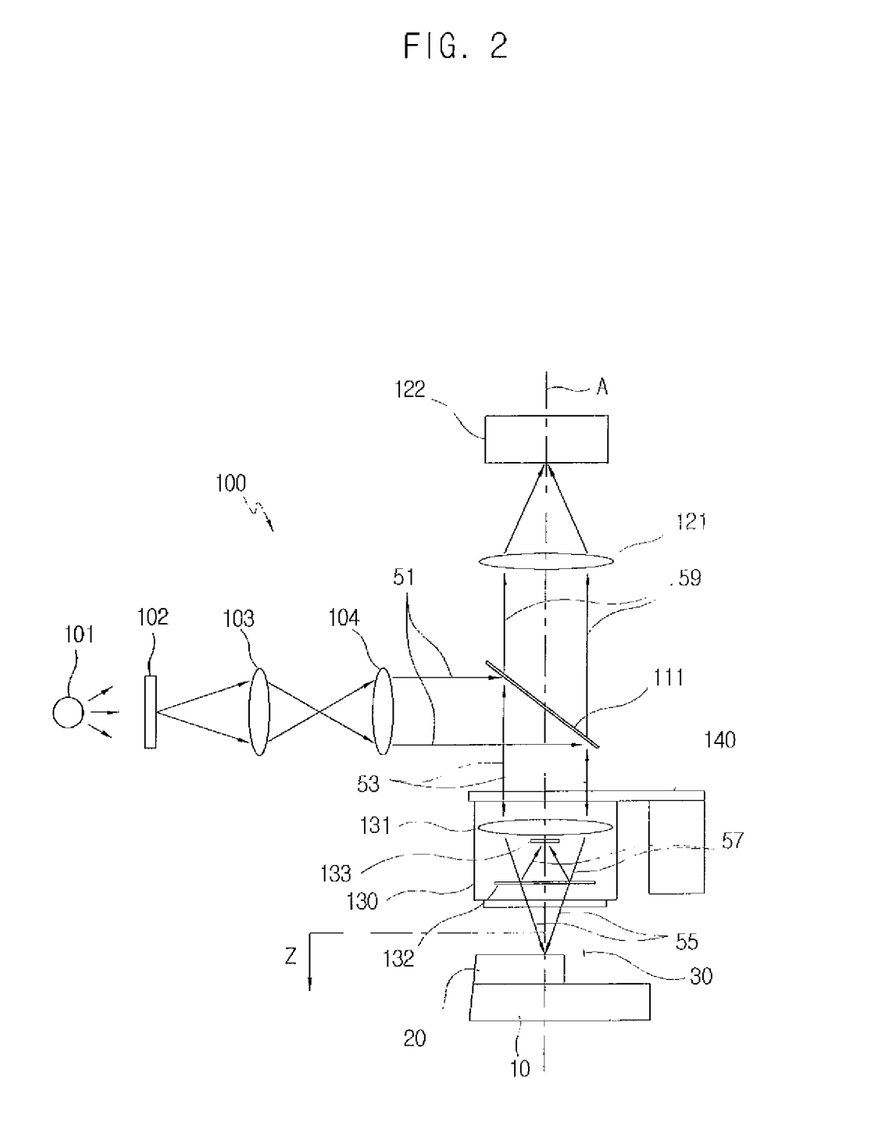
FIG. 2 shows an example of a white light interferometer for achieving a method of measuring thickness or a surface profile according to an exemplary embodiment of the present invention.

FIG. 2 shows an example of a white light interferometer for achieving a method of measuring thickness or a surface profile according to an exemplary embodiment of the present invention.

Referring to FIG. 2, an interferometer 100 employs a configuration of a Mirau-interferometer generally used in measuring the thickness or surface profile of a permeable thin film layer 20. The interferometer 100 includes a white light source 101, and various source lamps such as a halogen lamp, etc. may be used and the white light source 101. To decrease only brightness without changing a spectrum property of incident light from the white light source 101, a neutral density (ND) filter 102 is provided. The interferometer 100 includes a condensing lens 103 for condensing light passed through the ND filter 102. The light passed through the condensing lens 103 passes through a collimator 104 for making the light passed through the condensing lens 103 be parallel.

The light passed through the collimator 104 is split into reflection light 53 and transmission light 59 by a light splitter 111, and the reflection light 53 enters toward an object lens 131. Here, a ratio of reflectivity and transmittance of the light splitter 111 is 50:50.

The incident light from the object lens 131 is split again by a light splitter 132 into reflection light 57 and transmission light 55. The transmission light 55 is used as measurement light and emitted toward the permeable thin film layer 20 and a base layer 10. The reflection light 57 is used as reference light and emitted to a reference mirror 133. The light splitter 132 is to make interference light by collecting the reference light 57 reflected from the reference mirror 133 and the measurement light 55 reflected from an interface between the thin film layer 20 and the base layer 10. Also, the reference mirror 133 reflects the reference light 57 incident from the light splitter 132 again and makes it enter the light splitter 132.

The interferometer 100 includes a focusing lens 121 for focusing interference light 59 incident from the light splitter 111, and a detector 122 for detecting an interference signal from the interference light 59. In general, a charge coupled device (CCD) camera having the number of pixels adaptive to an area to be measured is employed as the detector 122.

Also, the interferometer 100 includes a driver 140 to acquire an interference signal while moving a measuring point by a minute distance in a direction intersecting the base layer 10, i.e., an optical axis direction. A body tube 130 accommodating the object lens 131 is mounted to the driver 140, so that the object lens 131 can move in the optical axis direction in accordance with operation of the driver 140. Here, the optical axis direction A perpendicular to the base layer 10 is defined as a Z-axis in FIG. 2. Thus, a position where a strong interference signal is detected through the detector 122 is found out while the object lens 131 moves up and down by a distance of several mm in the Z-axis with respect to the measuring point.

With the interferometer 100 configured as described above, the method for measuring thickness or a surface profile according to a first exemplary embodiment of the present invention will be described in detail with reference to FIGS. 3 through 6.

Figure 3:
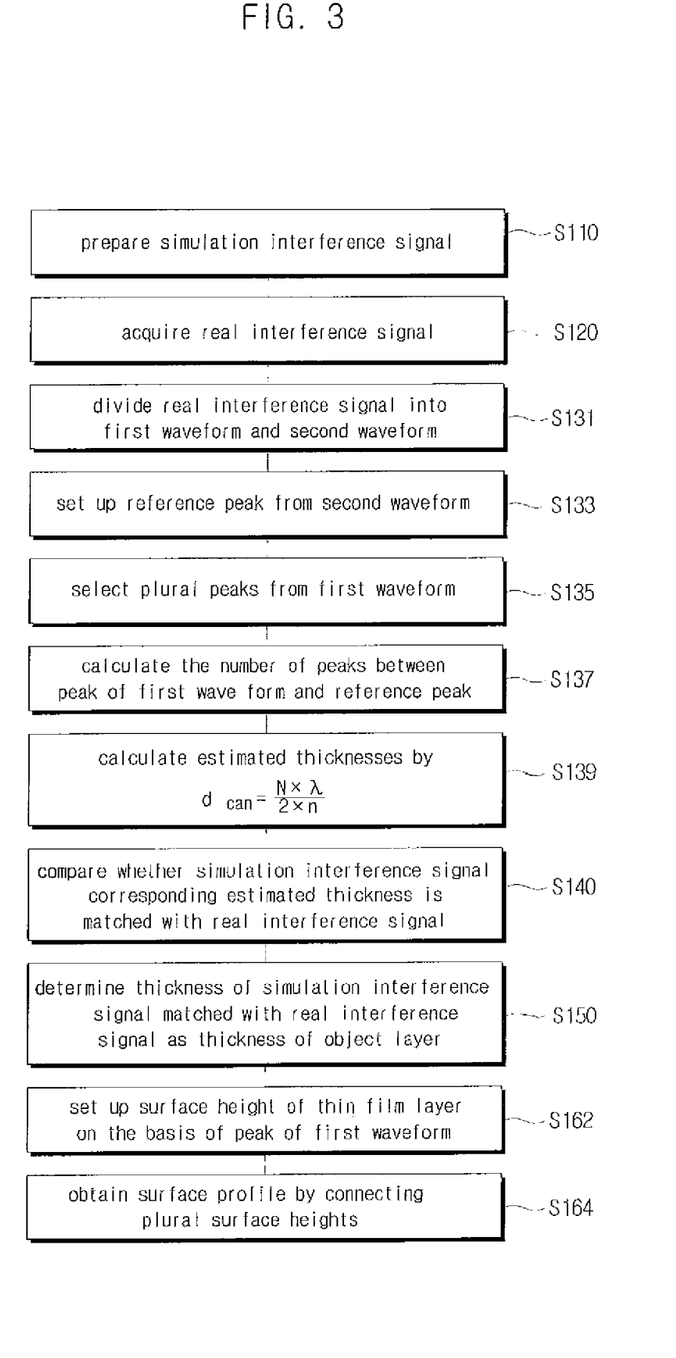
FIG. 3 is a flowchart of a method of measuring thickness or a surface profile according to a first exemplary embodiment of the present invention.
Figure 4:
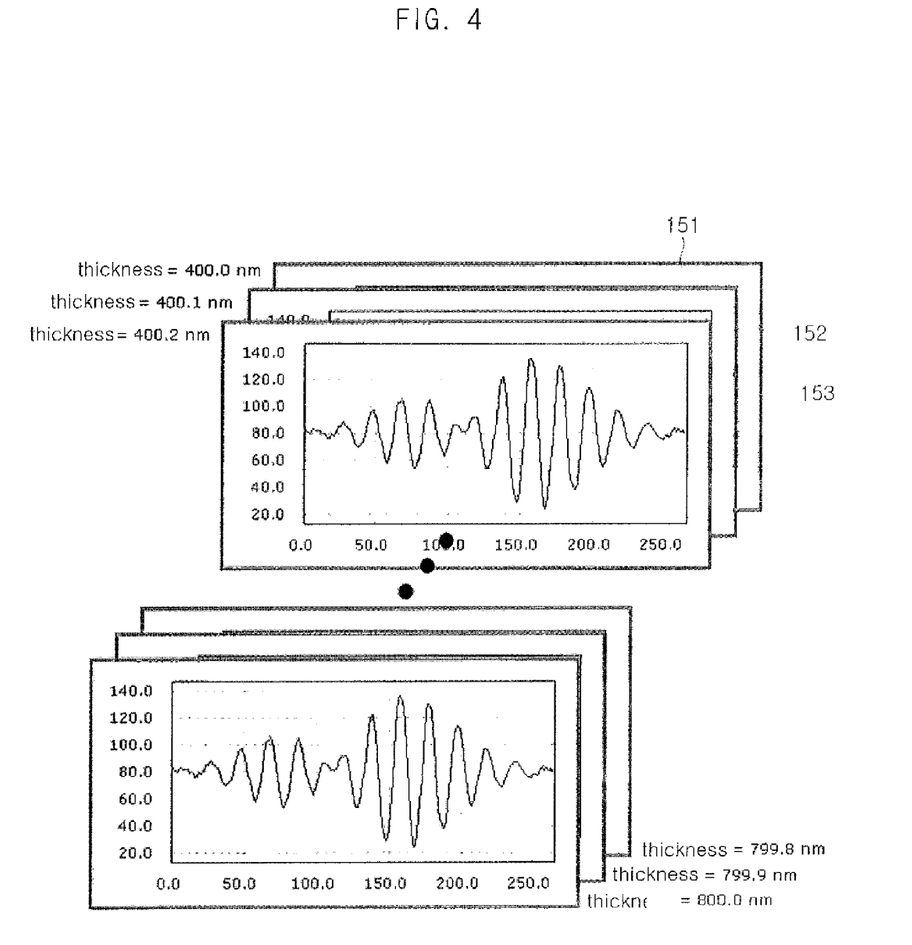
FIG. 4 shows a simulation interference signal with regard to sample thin film layers different in thickness from each other.
Figure 5:
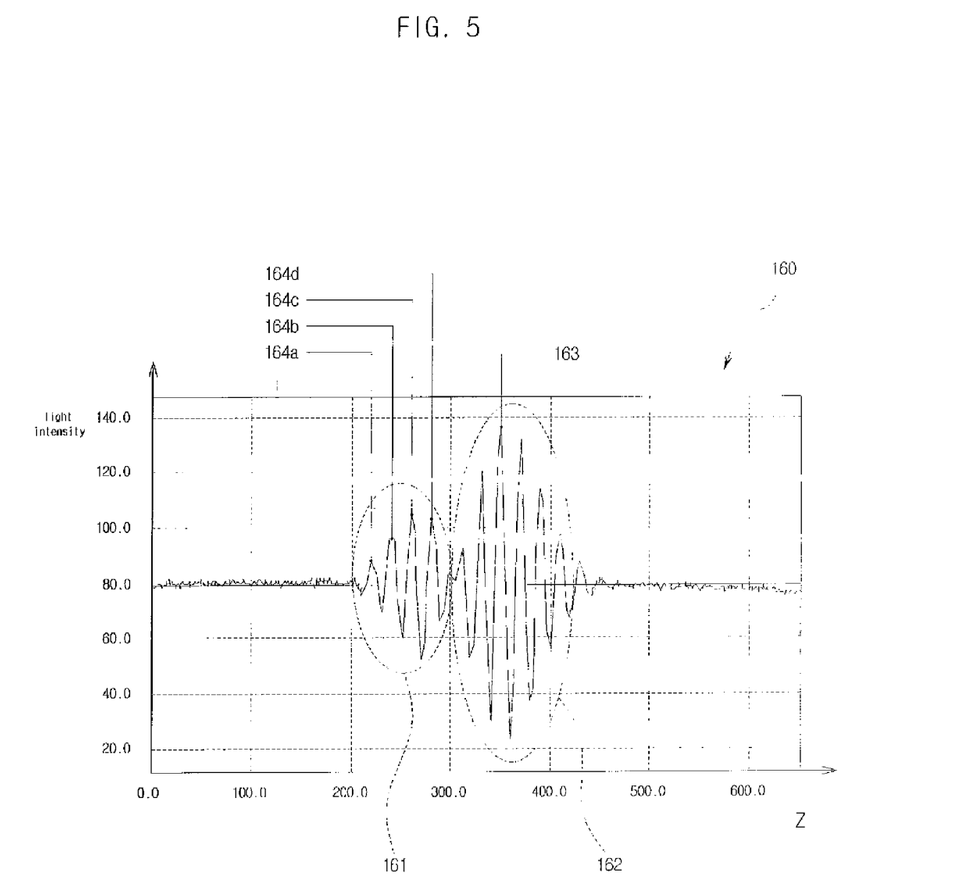
FIG. 5 shows a real interference signal acquired by illuminating a thin film layer with white light in the method of measuring thickness or a surface profile in FIG. 3.
Figure 6:
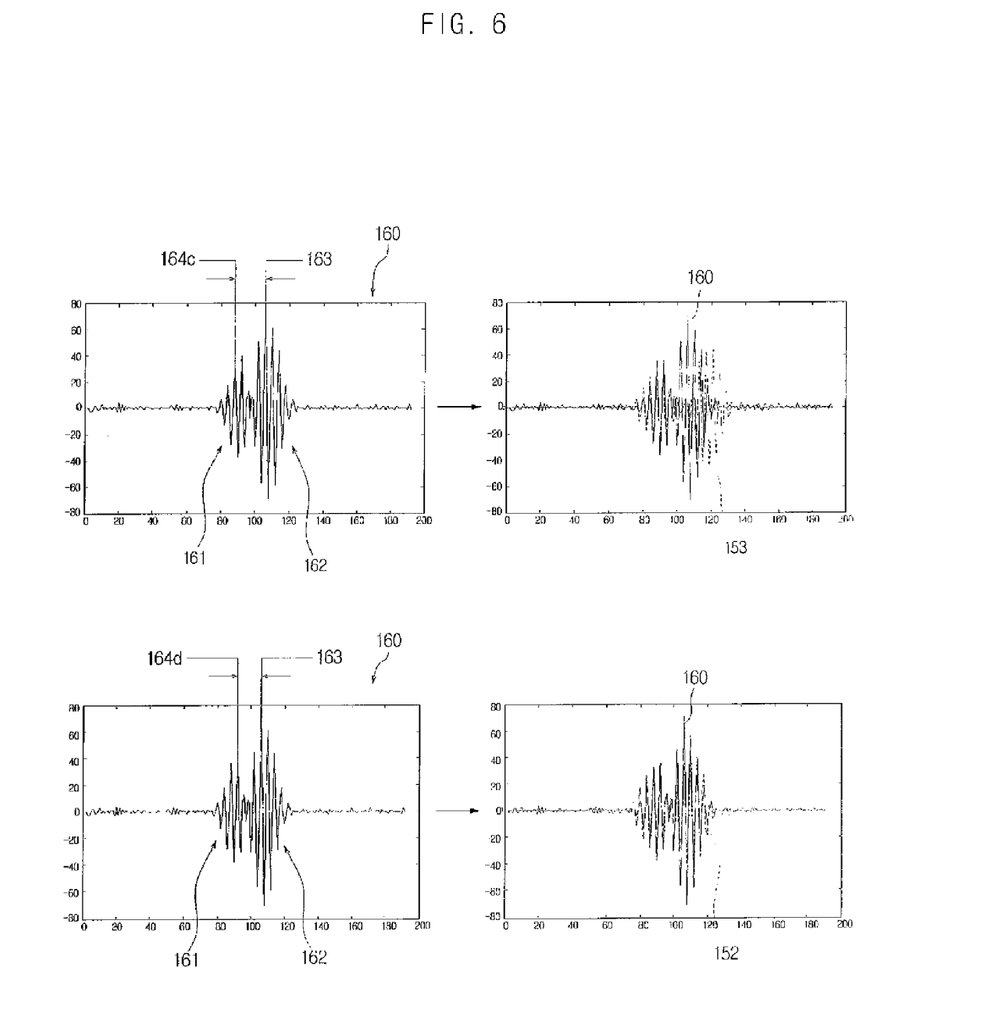
FIG. 6 is a view for explaining a process of comparing whether the simulation interference signal and the real interference signal are substantially matched with respect to each estimated thickness.

FIG. 3 is a flowchart of a method of measuring thickness or a surface profile according to a first exemplary embodiment of the present invention, FIG. 4 shows a simulation interference signal with regard to sample thin film layers different in thickness from each other, FIG. 5 shows a real interference signal acquired by illuminating a thin film layer with white light in the method of measuring thickness or a surface profile in FIG. 3, and FIG. 6 is a view for explaining a process of comparing whether the simulation interference signal and the real interference signal are substantially matched with respect to each estimated thickness.

As shown in FIG. 4, a plurality of sample thin film layers different in thickness from one another is assumed, and interference signals for the respective sample thin film layer are simulated to thereby prepare simulation interference signals 151, 152 and 153 corresponding to respective thicknesses (S110). Here, the sample thin film layers are not real thin film layers but virtual thin film layers different in thickness from one another for conducting a simulation. When the interference signal for the sample thin film layer is simulated, a property of matter, e.g., a reflective index and an absorption coefficient, which the thin film layer 20 to be measured with respect to its thickness has, will be used on the assumption that the sample thin film layer is made of the same material as the permeable thin film layer 20 of which thickness will be measured in practice.

The maximum and minimum of the thickness with regard to the simulation interference signals 151, 152 and 153 to be generated are previously set up, and the maximum thickness and the minimum thickness are separated by a predetermined distance. Then, the simulation interference signals 151, 152 and 153 are generated corresponding to the respective thicknesses. The maximum thickness and the minimum thickness for the simulation interference signals 151, 152 and 153 are determined the maximum thickness and the minimum thickness of the thin film layer 20 to undergo a process.

Then, the thin film layer 20 is illuminated with white light, and thus a real interference signal 160 is acquired with respect to the optical axis direction A of the light entering the thin film layer 20 (S120). The interference signal 160 measured in practice with respect to the thin film layer 20 is shown in FIG. 5. In this exemplary embodiment, the real interference signal 160 is a signal of variation in light intensity of interference light emitted to the thin film layer 20.

From the acquired real interference signal 160, a plurality of estimated thicknesses the thin film layer 20 may have are prepared. Alternatively, the thickness of the thin film layer 20 may be determined by matching comparison between the acquired real interference signal 160 and all the simulation interference signals 151, 152 and 153 without preparing the plurality of estimated thicknesses. However, if the acquired real interference signal 160 is compared with all the simulation interference signals 151, 152 and 153 one by one, there are problems that a system load increases and much time is taken in finally determining the thickness of the thin film layer 20 by finding out the simulation interference signal 151, 152 or 153 matched with the real interference signal 160. Thus, according to an exemplary embodiment of the present invention, the plurality of estimated thicknesses are prepared, and only the simulation interference signals 151, 152 and 153 corresponding to the estimated thicknesses are selected and compared with the real interference signal 160, thereby saving time taken in finally determining the thickness of the thin film layer 20.

To prepare the plurality of estimated thicknesses, the acquired real interference signal 160 is first divided into a first waveform 161 and a second waveform 162 (S131). The first waveform 161 is generated by interference on an interface between an air layer 30 and the thin film layer 20, which is positioned in a former part of the real interference signal 160. The second waveform 162 is generated by interference on an interface between the thin film layer 20 and the base layer 10, which is positioned in a latter part of the real interference signal 160.

Then, the maximum peak among peaks of the second waveform 162 is set up as a reference peak 163 (S133), and a plurality of peaks 164a, 164b, 164c and 164d is selected in the first waveform 161 (S135). In this exemplary embodiment, four peaks are selected in the first waveform 161. When the peaks of the first waveform 161 are combined with the reference peak 163, there are total four cases, that is, the first peak 164a and the reference peak 163, the second peak 164b and the reference peak 163, the third peak 164c and the reference peak 163, and the fourth peak 164d and the reference peak 163.

Then, the number of peaks existing between the first peak 164a and the reference peak 163, between the second peak 164b and the reference peak 163, between the third peak 164c and the reference peak 163, and between the fourth peak 164d and the reference peak 163 are calculated, respectively (S137).

The number of peaks calculated with respect to each case is substituted into the following expression, thereby calculating the estimated thicknesses (S139).

$$d_{con} = \frac{N \times \lambda}{2 \times n}$$

Where, $d_{can}$ is an estimated thickness, N is the number of peaks, $\lambda$ is an equivalent wavelength of the white light, and n is a refractive index of the thin film layer 20.

In this exemplary embodiment, there are four cases where the peaks of the first waveform 161 and the reference peak 163 are combined, and therefore four estimated thicknesses are also generated.

Then, as shown in FIG. 6, it is compared whether the simulation interference signals 151, 152 and 153 having the thicknesses corresponding to the estimated thicknesses are substantially matched with the real interference signal 160 (S140). In the process for ascertaining the substantial matching, a least square method is used to obtain an error function, and it is determined that two interference signals are "substantially matched" at the minimum error function. Such a method is well-known to those skilled in the art, and thus detailed descriptions thereof will be omitted.

For example, the estimated thickness is calculated on the basis of the number of peaks between the third peak 164c and the reference peak 163, and the error function is obtained by the least square method in order to determine whether the simulation interference signal 153 having the thickness corresponding to the estimated thickness is matched with the real interference signal 160. Then, the estimated thickness is calculated on the basis of the number of peaks between the fourth peak 164d and the reference peak 163, and the error function is obtained by the least square method in order to determine whether the simulation interference signal 152 having the thickness corresponding to the estimated thickness is matched with the real interference signal 160. Likewise, the error functions are obtained with respect to the first peak 164a and the reference peak 163 and to the second peak 164b and the reference peak 163, and it is determined that the two interference signals are "substantially matched" at the minimum error function. In this exemplary embodiment, it is assumed that the fourth peak 164d and the reference peak 163 are "substantially matched," and also FIG. 6 shows that the simulation interference signal and the real interference signal are approximately matched when they are superposed.

Then, the simulation interference signal substantially matched with the real interference signal 160 is selected, and the thickness corresponding to the simulation interference signal is finally determined as the thickness of the thin film layer 20 (S150).

Meanwhile, when the thickness of the thin film transistor 20 is determined on the basis of the simulation interference signal substantially matched with the real interference signal 160, the surface profile of the thin film layer 20 may also be obtained.

As shown in FIG. 6, if the estimated thickness obtained by the combination of the fourth peak 164d and the reference peak 163 is determined as the thickness of the real thin film layer 20, the position of the fourth peak 164d with respect to the optical-axis direction Z for entering the thin film layer 20, i.e., the Z-axis direction may be determined as an interface between the air layer 30 and the thin film layer 20.

Thus, in a graph of the real interference signal 160, an x-coordinate of the fourth peak 164d (i.e., the position of the fourth peak with respect to the Z-axis direction) is set up as a surface height (S162). At this time, a zero (0) point of the Z-axis direction is not an absolute reference, so that an absolute value of the x-coordinate of the fourth peak 164d (the x-coordinate of the individual fourth peak 164d) is meaningless but relative difference among a plurality of surface heights is meaningful.

The operation of setting up the surface height at each position while moving along the thin film layer 20 is repeated, and the surfaces heights are all connected to thereby generally acquire the relative difference among the surface heights of the thin film layer 20, that is, acquire the surface profile (S164). Through the relative difference between the surface heights of the thin film layer 20, it can be visualized what unevenness exists on the surface of the thin film layer 20 when it is formed. In this exemplary embodiment, the relative difference between the surface heights of the thin film layer 20 will be defined as the surface profile.

With the foregoing configuration, the method for measuring the thickness or surface profile according to the present exemplary embodiment does not compare the measured real interference signal with the simulation interference signals acquired by conducting the simulation one by one, but selects only the simulation interference signals corresponding to a limited number of estimated thicknesses and compares them with the real interference signal, thereby having an effect on saving time taken in finally determining the thickness of the thin film layer.

Also, since the thickness of the thin film layer is determined by comparing whether the measured real interference signal and the simulation interference signals are matched, the thickness can be correctly measured with regard to the thin film layer that is so thin that the interference can be generated between waveforms of different interfaces.

Also, not only the thickness of the thin film layer but also the surface profile meaning the relative height difference of the thin film layer are obtained at a time, so that comprehensive information about the thin film layer can be calculated and visualized.

Figure 7:
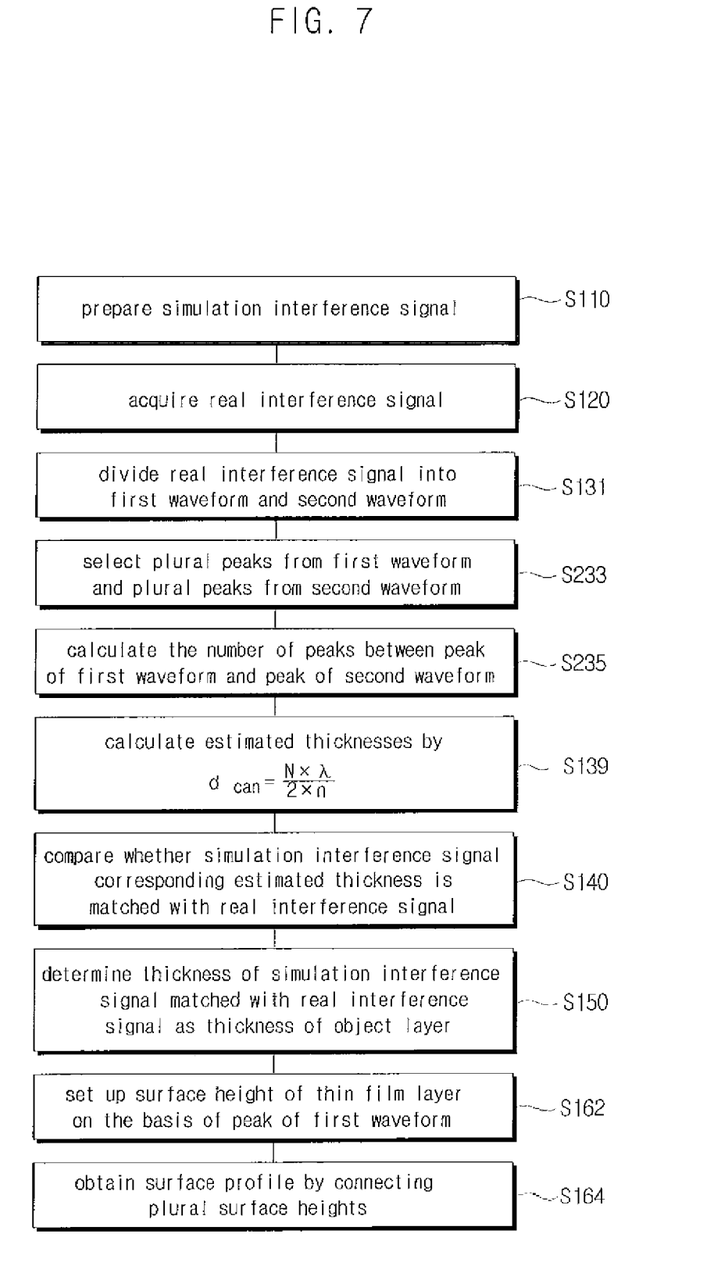
FIG. 7 is a flowchart of a method of measuring thickness or a surface profile according to a second exemplary embodiment of the present invention.
Figure 8:
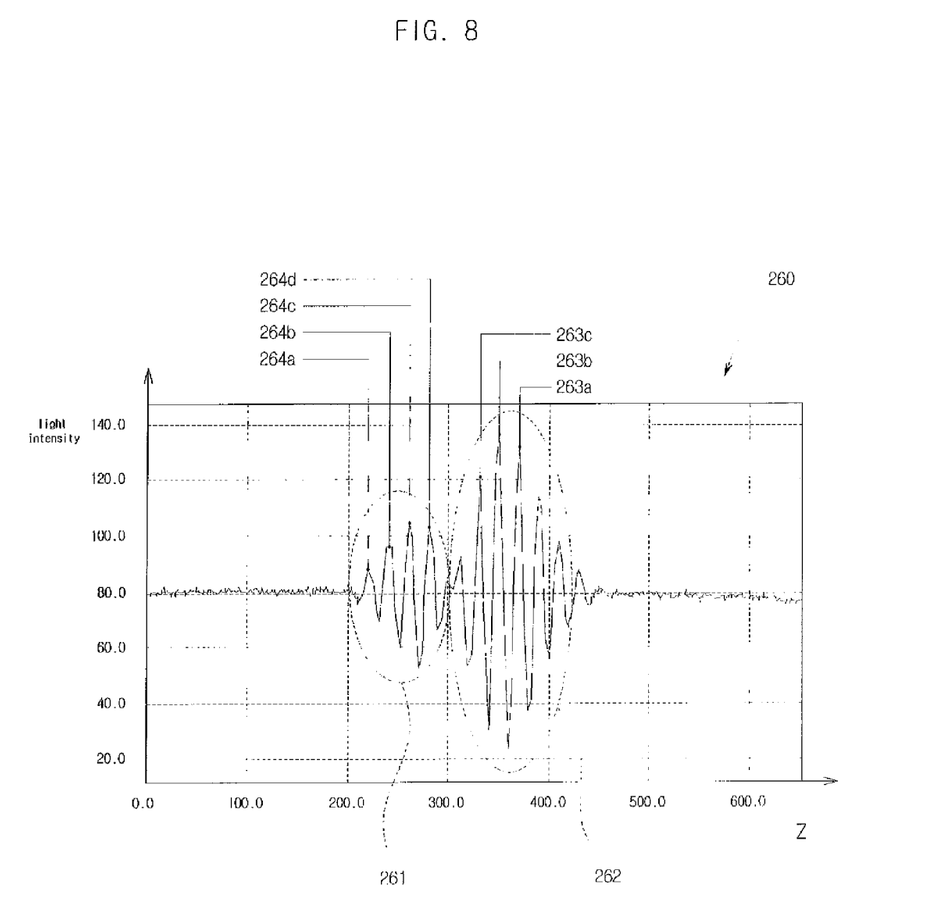
FIG. 8 shows a real interference signal acquired by illuminating a thin film layer with white light in the method of measuring thickness or a surface profile in FIG. 7.

Meanwhile, FIG. 7 is a flowchart of a method of measuring thickness or a surface profile according to a second exemplary embodiment of the present invention, and FIG. 8 shows a real interference signal acquired by illuminating a thin film layer with white light in the method of measuring thickness or a surface profile in FIG. 7. In FIGS. 7 and 8, like numerals shown in FIGS. 3 through 6 refer to like elements, and repetitive descriptions thereof will be avoided.

In this exemplary embodiment, a plurality of peaks 264a, 264b, 264c and 264d are selected from a first waveform 261 of the real interference signal 260 and a plurality of peaks 263a, 263b, 263c and 263d are selected from a second waveform 262, without setting up a reference peak from the second waveform (S233). In this exemplary embodiment, four peaks are selected from the first waveform 261, and three peaks are selected from the second waveform 262. If the peaks of the first waveform 261 and the peaks of the second waveform 262 are combined, there are twelve cases, that is, total twelve cases of a first peak 264a and a fifth peak 263a, a second peak 264b and the fifth peak 263a, . . . , the first peak 264a and a sixth peak 263, a second peak 264b and the sixth peak 263b, and so on.

Then, the number of peaks existing between the two peaks is calculated with respect to each case (S235), and twelve estimated thicknesses are prepared on the basis of the number of peaks to determine the thickness of the thin film layer 20.

In this exemplary embodiment, the number of cases is more than that of the first exemplary embodiment, but risk of incorrectly setting up the reference peak can be decreased.

Exemplary embodiments of the present invention are applicable to a method for measuring thickness of a surface profile, in which the thickness and surface profile of a permeable thin film layer can be correctly measured using a white light scanning interferometry.

As described above, a limited number of estimated thicknesses are prepared, and only simulation interference signals are selected corresponding to the estimated thicknesses and compared with real interference signals, thereby saving time taken in finally determining the thickness of a thin film layer.

Also, the thickness of the thin film layer is determined by matching comparison between the measured real interference signal and the simulation signal, so that it is possible to correctly measure the thickness of the thin film layer which is so thin that interference can be generated between waveforms on different interfaces.

Further, it is possible to obtain not only the thickness of the thin film layer but also a surface profile that means a relative height difference between the thin film layers, thereby calculating comprehensive information about the thin film layer and visualizing it.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of measuring a thickness or a surface profile of a thin film layer formed on a base layer through white light scanning interferometry, the method comprising:
   generating a plurality of simulated interferograms corresponding to a plurality of sample thin film layers, wherein the plurality of sample thin film layers each have a different thickness;
   acquiring a real interferogram by illuminating the thin film layer with white light and measuring light intensity along an optical-axis direction, wherein the optical-axis direction is perpendicular to the base layer;
   determining a plurality of estimated thicknesses that the thin film layer may have by selecting two or more peaks from the real interferogram, wherein the plurality of estimated thicknesses are determined based on the number of peaks between the two or more selected peaks;

selecting from the plurality of simulated interferograms only those simulated interferograms having thicknesses that correspond to the plurality of estimated thicknesses from the real interferogram; and comparing the selected simulated interferograms with the real interferogram to determine which selected simulated interferogram substantially matches the real interferogram, wherein the thickness of the thin film layer is the thickness of the selected simulated interferogram that substantially matches the real interferogram.

2. The method according to claim 1, wherein determining the plurality of estimated thicknesses comprises dividing the real interferogram into a first waveform generated by interference on an interface between an air layer and the thin film layer, and a second waveform generated by interference on an interface between the thin film layer and the base layer;

selecting peaks from the first waveform and the second waveform, respectively; and extracting the plurality of estimated thicknesses on the basis of the number of peaks between a peak of the first waveform and a peak of the second waveform.

3. The method according to claim 2, wherein the selecting the peaks comprises setting up the maximum peak among the peaks of the second waveform as a reference peak; and selecting a plurality of peaks from the first waveform, and extracting the plurality of estimated thicknesses comprises combining the peaks of the first waveform with the reference peak, and calculating the number of peaks between the peak of the first waveform and the reference peak with regard to each combination case; and calculating the plurality of estimated thicknesses on the basis of the number of peaks.

4. The method according to claim 2, wherein the selecting the peak comprises selecting a plurality of peaks from the first waveform, and a plurality of peaks from the second waveform, and the extracting the plurality of estimated thicknesses comprises combining the peaks of the first waveform with the peaks of the second waveform, and calculating the number of peaks between the peak of the first waveform and the peak of the second waveform with regard to each combination case; and calculating the plurality of estimated thicknesses on the basis of the number of peaks.

5. The method according to claim 3, wherein each of the plurality of estimated thicknesses is calculated by the following expression $$d_{con} = \frac{N \times \lambda}{2 \times n}$$

where, $d_{can}$ is the estimated thickness, N is the number of peaks, $\lambda$ is an equivalent wavelength of the white light, and n is a refractive index of the thin film layer.

6. The method according to claim 4, wherein each of the plurality of estimated thicknesses is calculated by the following expression $$d_{con} = \frac{N \times \lambda}{2 \times n}$$

where, $d_{can}$ is the estimated thickness, N is the number of peaks, $\lambda$ is an equivalent wavelength of the white light, and n is a refractive index of the thin film layer.

7. The method according to claim 2, further comprising setting up a position about the optical-axis direction of entering the thin film layer as a surface height of the thin film layer, with respect to the peak of the first waveform corresponding to the determined thickness of the thin film layer; and obtaining a surface profile of the thin film layer by repeating the setup of the surface height while moving along the thin film layer.

* * * * *

UNITED STATES PATENT AND TRADEMARK OFFICE
CERTIFICATE OF CORRECTION

PATENT NO. : 8,947,673 B2  
APPLICATION NO. : 12/993301  
DATED : February 3, 2015  
INVENTOR(S) : Heui Jae Pahk et al.

Page 1 of 1

It is certified that error appears in the above-identified patent and that said Letters Patent is hereby corrected as shown below:

In the Claims

Claim 4 (column 10, line 1)

"...the extracting the plurality of estimated thickness com-..." should read --extracting the plurality of estimated thickness com- --

Signed and Sealed this
Fourteenth Day of July, 2015

Michelle K. Lee
*Director of the United States Patent and Trademark Office*